Patented June 11, 1946

2,401,933

UNITED STATES PATENT OFFICE 2,401,933

POLYMERIZATION OF OLEFINS TO OILY POLYMERS

Arthur B. Hersberger, Drexel Hill, Pa., assignor to The Atlantic Refining Company, Philadelphia, Pa., a corporation of Pennsylvania No Drawing. Application November 25, 1943, Serial No. 511,748

5 Claims. (Cl. 260—683.15)

This invention relates to the production of oily polymers from olefin hydrocarbons and comprehends a practical and economical process for producing lubricating oils from propylene or from admixtures of propylene with other low molecular weight olefins. In a preferred embodiment of the invention, the olefinic material subjected to the process is a mixture comprising propylene and isobutylene.

Processes heretofore proposed for the preparation of high molecular weight oils suitable for use as lubricating oils from low molecular weight olefins, which term I shall use herein and in the appended claims to designate olefins of from two to nine carbon atoms, are characterized by low yields, particularly when operated on a commercial scale. According to the present invention, in excess of 80 per cent by weight of the olefin or olefins treated may be converted to oil of lubricating oil viscosity and with no substantial increase in cost.

My process is executed by contacting an olefin liquid comprising an olefin of not more than three carbon atoms, which olefin is most preferably propylene because of the difficulties incident to the liquefaction of ethylene, at a temperature of from $-10°$ C. to $35°$ C. with an active Friedel-Crafts halide catalyst in the presence of a solvent for the catalyst which is substantially inert under the reaction conditions.

Although I prefer anhydrous aluminum chloride as the active Friedel-Crafts halide catalyst, I may use in lieu thereof, for example, aluminum bromide, aluminum iodide, tin tetrachloride, titanium tetrachloride, ferric chloride, ferric bromide, or the like. Solvents, in the presence of which the reaction is carried out, are distinguished from other organic solvents, in which the metal halide catalysts employable herein are also soluble in that they do not form inactive complexes with such catalysts, or in any other way act to hinder the progress of the polymerization. The solvent employed is most suitably methyl or ethyl chloride, but other low molecular weight alkyl monohalides, such as methyl bromide and iodide, ethyl bromide and iodide, isopropyl chloride, bromide, and iodide, amyl chloride, etc., may be used. The corresponding fluorides, although applicable, are in general less satisfactory. While some of these solvents may act in a small way to promote the activity of the catalyst, they are best described as substantially inert under the reaction conditions.

I have previously stated that in a preferred embodiment of my invention the mixture subjected to treatment comprises propylene and isobutylene. Usually I employ a mixture containing from 20 to 70 per cent by weight of propylene since I have found that the presence in the mixture of either a larger or smaller amount of propylene has an adverse effect on the viscosity index of the resulting oil. The treatment of a mixture of propylene and isobutylene containing in excess of 70 per cent propylene, however, may be carried out to give a high yield of a high viscosity oil well adapted for use in certain applications, such as in the lubrication of steam cylinders, where high viscosity is essential and the viscosity index of the oil of relatively minor importance. If desired, such oils may be used in the form of blends with Pennsylvania lubricating oils or with synthetic oils having temperature-viscosity characteristics comparable to Pennsylvania lubricating oils.

I have produced oils of highest viscosity by treating propylene in the absence of any other olefin, but I may prepare oils from mixtures of propylene and normal butylene which are nearly as viscous and which, at the same time, show a higher viscosity index. The copolymerization with propylene of olefins of from five to nine carbon atoms, for example, octylenes, such as di-isobutylene, or straight or branched chain amylenes, hexenes, or heptenes, may be carried out according to the herein described method to yield oils, which, insofar as viscosity index is concerned, are fully the equal of high grade Pennsylvania lubricating oil. Because of the relatively low viscosity of such oils, they may perhaps be most advantageously employed in blends with oils of high viscosity, for example, an oil prepared according to the invention by polymerizing propylene alone. The following inspection is typical of an oil produced from a mixture containing 72 parts by weight of di-isobutylene and 28 parts by weight of propylene:

| | |
|---|---|
| Gravity (A. P. I.) | 42.8° |
| Saybolt viscosity at 100° F | 51.7" |
| Saybolt viscosity at 210° F | 34.0" |
| Viscosity index | 100 |

My invention as applied to mixtures of olefins is not limited to mixtures containing only two olefins or to mixtures which are free of non-polymerizable constituents, e. g., saturated hydrocarbons; thus, I may treat all or a part of a cracked distillate, which may have been produced, for example, by the cracking of a gas oil or wax fraction. It is essential for operation according to the invention that the distillate treated contain an olefin of not more than three carbon atoms, preferably propylene.

The following is illustrative of the detailed practice of my invention: A mixture of propylene and isobutylene containing from 25 to 75 per cent of propylene, preferably 40 to 60 per cent, is liquefied and is thereafter diluted with from ½ to 2 volumes of ethyl chloride. The diluted solution is then contacted with a suitable polymerization catalyst. For example, the diluted solution is placed in a suitable pressure vessel such as an autoclave, and is then sprayed with a 1 per cent solution of anhydrous aluminum chloride in ethyl chloride by means of an atomizing device which operates to transform the solution into very finely divided liquid particles. Normally, about 1 volume of catalyst solution for each 10 volumes of olefin liquid is required to effect the desired reaction. During the reaction, which is conducted under a pressure sufficient to maintain the olefins in the liquid state, the reaction temperature is controlled through the use of suitable refrigerants such as ice and water, brine, etc. The reactants are vigorously agitated throughout the reaction, completion of which is marked by the cessation of the evolution of heat. The reaction is of extremely short duration. Recovery of the product polymer is effected by washing the reacted mixture with water to remove the catalyst as the metal hydroxide, and distilling off the unreacted olefins. Prior to the water wash, the reacted mixture may be diluted as with a light naphtha fraction to reduce the viscosity of the polymer.

Applying the catalyst solution in the form of finely divided liquid particles is highly advantageous from the standpoint of preventing local overheating at the point of first contact of the olefin liquid with the catalyst solution. However, I may operate by introducing a relatively coarse stream of the catalyst solution into contact with the olefin liquid, such stream being fed to the reactor, of course, under a pressure sufficient to overcome the vapor pressure of the reactants. Dilution of the olefin liquid prior to contacting it with the catalyst solution is not essential, but better results are usually obtained. It is important that the temperature be held within the limits specified, i. e., −10° C. to 35° C. and particularly that lower temperatures be avoided. I have found that at temperatures of the order of, for example, −50° C. to −100° C., little if any polymerization of the propylene-containing mixtures will occur, and even at −20° C. poor yields are generally obtained. When the olefin liquid comprises an olefin of more than four carbon atoms, it is advisable to employ a 3 to 5 per cent catalyst solution instead of the 1 per cent solution used in the case of mixtures consisting of propylene and isobutylene.

Olefins treated according to the hereindescribed process may be derived from petroleum sources or may be prepared, for example, by the catalytic or non-catalytic dehalogenation of alkyl halides, by the removal of water from alcohols, or by the polymerization of simpler olefin compounds, e. g., di-isobutylene from isobutylene.

In the accompanying table, the characteristics of oils prepared by the treatment of various mixtures of propylene and isobutylene are given together with the characteristics of an oil prepared from a mixture of propylene and normal butene.

*Table I*

| Reactants, percent | | Yield, percent | Gravity (A. P. I.) | Saybolt viscosity at— | | Viscosity index |
| --- | --- | --- | --- | --- | --- | --- |
| Propylene | Isobutylene | | | 100° F. | 210° F. | |
| 100 | | 75-80 | 34.2-35.2 | 2430-3450 | 108-128 | 38.4 |
| | | | | | | 35.6 |
| 80 | 20 | 80 | 34.9 | 1287 | 82.5 | 50.6 |
| 50 | 50 | 85 | 35.7 | 539 | 63.2 | 85.5 |
| 42.8 (1 mol) | 57.2 (1 mol) | 70 | 34.4 | 1374 | 100 | 87 |
| 42.8 (1 mol) | 57.2 (1 mol) | 68 | 34.5 | 1259 | 91.8 | 80 |
| 25 | 75 | 85 | 34.6 | 547 | 63.5 | 86 |
| | ¹100 | | | 100 | 38.3 | 64 |
| | Butene-1 | | | | | |
| 42.8 (1 mol) | 57.2 (1 mol) | 64 | 35.0 | 2370 | 117 | 61 |

¹ Distilled fraction.

From the table it will be noted that the oils produced using equi-molecular proportions of propylene and isobutylene are possessed of the best all-round characteristics. In order to test the resistance of these oils toward oxidation, samples thereof, together with a sample of the oil produced from propylene alone, were subjected to an oxidation test which comprised heating the samples at 340° F. for 96 hours, while blowing them with air introduced at a rate of 3 liters per 100 cc. of oil per hour. In each instance less than 8 milligrams of sludge developed in the oil for each 10 grams of oil subjected to the test. An S. A. E. 30 solvent refined oil when subjected to the same test showed 95 milligrams of sludge per 10 grams of oil tested.

I claim:

1. The method of producing lubricating oil, which comprises providing a mixture of liquid propylene and liquid isobutylene, the propylene representing 40% to 60% of the mixture, bringing the temperature of the mixture within the range of −10° C. to +35° C., and spraying the mixture with a solution of a Friedel-Crafts type catalyst in a lower alkyl halide, said catalyst solution being applied in the form of finely divided liquid particles at a temperature between −10° C. and +35° C. and the mixture being vigorously agitated during the addition of the catalyst solution and the ensuing polymerization reaction.

2. The method of producing lubricating oil, which comprises providing a mixture of liquid propylene and liquid isobutylene, the propylene representing 40% to 60% of the mixture, diluting the mixture with a lower alkyl halide, bringing the temperature of the diluted mixture within the range of −10° C. to +35° C., spraying the diluted mixture with a solution of a Friedel-Crafts type catalyst in a lower alkyl halide, said catalyst solution being applied in the form of finely divided liquid particles at a temperature between −10° C. and +35° C. and the diluted mixture being vigorously agitated during the addition of the catalyst solution and the ensuing polymerization reaction.

3. The method of producing lubricating oil, which comprises providing a mixture of liquid propylene and liquid isobutylene, the propylene representing 40% to 60% of the mixture, diluting the mixture with ethyl chloride, bringing the temperature of the diluted mixture within the range of —10° C. to +35° C., and spraying the diluted mixture with a solution of aluminum chloride in ethyl chloride, said aluminum chloride solution being applied in the form of finely divided liquid particles at a temperature between —10° C. and +35° C. and the diluted mixture being vigorously agitated during the addition of the aluminum chloride solution and the ensuing polymerization reaction.

4. The method of producing lubricating oil, which comprises providing a mixture of liquid propylene and liquid isobutylene, the propylene representing 40% to 60% of the mixture, diluting the mixture with from 0.5 to 2 volumes of ethyl chloride, bringing the temperature of the diluted mixture within the range of —10° C. to +35° C. and spraying the diluted mixture with a solution of aluminum chloride in ethyl chloride, said aluminum chloride solution being applied in the form of finely divided liquid particles at a temperature between —10° C. and +35° C. and the diluted mixture being vigorously agitated during the addition of the aluminum chloride solution and the ensuing polymerization reaction.

5. The method of producing lubricating oil, which comprises providing a mixture of liquid propylene and liquid isobutylene in equi-molar proportions, diluting the mixture with 0.5 to 2 volumes of ethyl chloride, bringing the temperature of the diluted mixture within the range of —10° C. to +35° C., and spraying the diluted mixture with a solution of aluminum chloride in ethyl chloride, said aluminum chloride solution being applied in the form of finely divided liquid particles at a temperature between —10° C. and +35° C. and the diluted mixture being vigorously agitated during the addition of the aluminum chloride solution and the ensuing polymerization reaction.

ARTHUR B. HERSBERGER.